United States Patent [19]

Fukui

[11] Patent Number: 5,309,381
[45] Date of Patent: May 3, 1994

[54] PROBABILITY ESTIMATION TABLE APPARATUS

[75] Inventor: Ryo Fukui, Yao, Japan

[73] Assignee: Ricoh Company, Ltd., Tokyo, Japan

[21] Appl. No.: 865,313

[22] Filed: Apr. 8, 1992

[30] Foreign Application Priority Data

Apr. 10, 1991 [JP] Japan ............................. 3-077633
Feb. 27, 1992 [JP] Japan ............................. 4-041141

[51] Int. Cl.$^5$ ............................................. G06F 1/02
[52] U.S. Cl. ................................ 364/715.02; 382/56
[58] Field of Search ............ 364/715.02, 715.01; 382/56; 341/107

[56] References Cited

U.S. PATENT DOCUMENTS

| | | | |
|---|---|---|---|
| 4,024,385 | 5/1977 | Richards | 364/721 |
| 4,373,191 | 2/1983 | Fette et al. | 364/715.01 |
| 4,831,570 | 5/1989 | Abiko | 364/715.01 |
| 5,025,258 | 6/1991 | Duttweiler | 341/107 |

FOREIGN PATENT DOCUMENTS 1577591 8/1969 France.

OTHER PUBLICATIONS

M. Mano, "Computer System Architecture", 1982, p. 243, Prentice/Hall International, Inc.
ISO/IEC International Standard of Coded Representation of Picture and Audio Information, Early Draft, WG9-SiR2, Dec. 14, 1990, pp. 1-3, 38-44.

*Primary Examiner*—David H. Malzahn
*Attorney, Agent, or Firm*—Oblon, Spivak, McClelland, Maier & Neustadt

[57] ABSTRACT

A probability estimation table reading apparatus includes a memory part for storing a probability estimation table, the table defining, for each address value, a switch data value, a probability estimate data value, an LPS data value indicative of a next address when a more probable symbol occurs and an MPS data value indicative of a next address when a less probable symbol occurs, and a control part for reading out each the LPS data value and MPS data value for a current address value of the stored table, so that next address values required by an arithmetic coder to perform arithmetic coding data compression, can be generated. Each of the LPS data value in the stored table stored in the memory part has been replaced by the difference between a current address value and a next address value indicated by a standard LPS data value for the current address value, and each of the MPS data value has been replaced by the difference between the current address value and a next address value indicated by a standard MPS data value for the current address value.

12 Claims, 9 Drawing Sheets

FIG.1A
(PRIOR ART)

| INDEX (CX) | QE -VALUE | NEXT INDEX -LPS | INDEX -MPS | SWITCH -MPS | INDEX (CX) | QE -VALUE | NEXT LPS | INDEX -MPS | SWITCH -MPS |
|---|---|---|---|---|---|---|---|---|---|
| 0 | X'5a1d' | 1 | 1 | 1 | 28 | X'0144' | 56 | 29 | 0 |
| 1 | X'2586' | 14 | 2 | 0 | 29 | X'00f5' | 57 | 30 | 0 |
| 2 | X'1114' | 16 | 3 | 0 | 30 | X'00b7' | 59 | 31 | 0 |
| 3 | X'080' | 18 | 4 | 0 | 31 | X'008a' | 60 | 32 | 0 |
| 4 | X'03d8' | 20 | 5 | 0 | 32 | X'0068' | 62 | 33 | 0 |
| 5 | X'01da' | 23 | 6 | 0 | 33 | X'004e' | 63 | 34 | 0 |
| 6 | X'00e5' | 25 | 7 | 0 | 34 | X'003b' | 32 | 35 | 0 |
| 7 | X'006' | 28 | 8 | 0 | 35 | X'002c' | 33 | 9 | 0 |
| 8 | X'0036' | 30 | 9 | 0 | 36 | X'5ae1' | 37 | 37 | 1 |
| 9 | X'001a' | 33 | 10 | 0 | 37 | X'484c' | 64 | 38 | 0 |
| 10 | X'000d' | 35 | 11 | 0 | 38 | X'3a0d' | 65 | 39 | 0 |
| 11 | X'0006' | 9 | 12 | 0 | 39 | X'2ef1' | 67 | 40 | 0 |
| 12 | X'0003' | 10 | 13 | 0 | 40 | X'261f' | 68 | 41 | 0 |
| 13 | X'0001' | 12 | 13 | 0 | 41 | X'1f33' | 69 | 42 | 0 |
| 14 | X'5a7f' | 15 | 15 | 1 | 42 | X'19a8' | 70 | 43 | 0 |
| 15 | X'3f25' | 36 | 16 | 0 | 43 | X'1518' | 72 | 44 | 0 |
| 16 | X'2cf2' | 38 | 17 | 0 | 44 | X'1177' | 73 | 45 | 0 |
| 17 | X'207c' | 39 | 18 | 0 | 45 | X'0e74' | 74 | 46 | 0 |
| 18 | X'17b9' | 40 | 19 | 0 | 46 | X'0bfb' | 75 | 47 | 0 |
| 19 | X'1182' | 42 | 20 | 0 | 47 | X'09f8' | 77 | 48 | 0 |
| 20 | X'0cef' | 43 | 21 | 0 | 48 | X'0861' | 78 | 49 | 0 |
| 21 | X'09a1' | 45 | 22 | 0 | 49 | X'0706' | 79 | 50 | 0 |
| 22 | X'072f' | 46 | 23 | 0 | 50 | X'05cd' | 48 | 51 | 0 |
| 23 | X'055c' | 48 | 24 | 0 | 51 | X'04de' | 50 | 52 | 0 |
| 24 | X'0406' | 49 | 25 | 0 | 52 | X'040f' | 50 | 53 | 0 |
| 25 | X'0303' | 51 | 26 | 0 | 53 | X'0363' | 51 | 54 | 0 |
| 26 | X'0240' | 52 | 27 | 0 | 54 | X'02d4' | 52 | 55 | 0 |
| 27 | X'01b1' | 54 | 28 | 0 | 55 | X'025c' | 53 | 56 | 0 |

FIG. 1B
(PRIOR ART)

| INDEX (CX) | QE-VALUE | NEXT INDEX-LPS | INDEX-MPS | SWITCH-MPS | INDEX (CX) | QE-VALUE | NEXT INDEX-LPS | INDEX-MPS | SWITCH-MPS |
|---|---|---|---|---|---|---|---|---|---|
| 56 | X'01f8' | 54 | 57 | 0 | 85 | X'2eae' | 92 | 86 | 0 |
| 57 | X'01a4' | 55 | 58 | 0 | 86 | X'299' | 93 | 87 | 0 |
| 58 | X'0160' | 56 | 59 | 0 | 87 | X'2516' | 86 | 71 | 0 |
| 59 | X'0125' | 57 | 60 | 0 | 88 | X'5570' | 88 | 89 | 1 |
| 60 | X'00f6' | 56 | 61 | 0 | 89 | X'4ca9' | 95 | 90 | 0 |
| 61 | X'00cb' | 59 | 62 | 0 | 90 | X'44d9' | 96 | 91 | 0 |
| 62 | X'00ab' | 61 | 63 | 0 | 91 | X'3e22' | 97 | 92 | 0 |
| 63 | X'008f' | 61 | 62 | 0 | 92 | X'3824' | 99 | 93 | 0 |
| 64 | X'5b12' | 65 | 65 | 1 | 93 | X'32b4' | 99 | 94 | 0 |
| 65 | X'4d04' | 80 | 66 | 0 | 94 | X'2e17' | 93 | 86 | 0 |
| 66 | X'412c' | 81 | 67 | 0 | 95 | X'56a8' | 95 | 96 | 1 |
| 67 | X'37d8' | 82 | 68 | 0 | 96 | X'4f46' | 101 | 97 | 0 |
| 68 | X'2fe8' | 83 | 69 | 0 | 97 | X'47e5' | 102 | 98 | 0 |
| 69 | X'293c' | 84 | 70 | 0 | 98 | X'41cf' | 103 | 99 | 0 |
| 70 | X'2379' | 86 | 71 | 0 | 99 | X'3c3d' | 104 | 100 | 0 |
| 71 | X'1edf' | 87 | 72 | 0 | 100 | X'375e' | 99 | 93 | 0 |
| 72 | X'1aa9' | 87 | 73 | 0 | 101 | X'5231' | 105 | 102 | 0 |
| 73 | X'174e' | 72 | 74 | 0 | 102 | X'4c0f' | 106 | 103 | 0 |
| 74 | X'1424' | 72 | 75 | 0 | 103 | X'4639' | 107 | 104 | 0 |
| 75 | X'119c' | 74 | 76 | 0 | 104 | X'415e' | 103 | 99 | 0 |
| 76 | X'0f6b' | 74 | 77 | 0 | 105 | X'5627' | 105 | 106 | 1 |
| 77 | X'0d51' | 75 | 78 | 0 | 106 | X'50e7' | 108 | 107 | 0 |
| 78 | X'0bb6' | 77 | 79 | 0 | 107 | X'4b85' | 109 | 103 | 0 |
| 79 | X'0a40' | 77 | 48 | 0 | 108 | X'5597' | 110 | 109 | 0 |
| 80 | X'5832' | 80 | 81 | 1 | 109 | X'504f' | 111 | 107 | 0 |
| 81 | X'4d1c' | 88 | 82 | 0 | 110 | X'5a10' | 110 | 111 | 1 |
| 82 | X'438e' | 89 | 83 | 0 | 111 | X'5522' | 112 | 109 | 0 |
| 83 | X'3bdd' | 90 | 84 | 0 | 112 | X'59eb' | 112 | 111 | 1 |
| 84 | X'34ee' | 91 | 85 | 0 | | | | | |

FIG.2

|     | LPS | MPS |     | LPS | MPS |     | LPS | MPS |
|-----|-----|-----|-----|-----|-----|-----|-----|-----|
| 0   | + 1 | + 1 | 41  | +28 | + 1 | 81  | + 7 | + 1 |
| 1   | +13 | + 1 | 42  | +28 | + 1 | 82  | + 7 | + 1 |
| 2   | +14 | + 1 | 43  | +29 | + 1 | 83  | + 7 | + 1 |
| 3   | +15 | + 1 | 44  | +29 | + 1 | 84  | + 7 | + 1 |
| 4   | +16 | + 1 | 45  | +29 | + 1 | 85  | + 7 | + 1 |
| 5   | +18 | + 1 | 46  | +29 | + 1 | 86  | + 7 | + 1 |
| 6   | +19 | + 1 | 47  | +30 | + 1 | 87  | - 1 | -16 |
| 7   | +21 | + 1 | 48  | +30 | + 1 | 88  |   0 | + 1 |
| 8   | +22 | + 1 | 49  | +30 | + 1 | 89  | + 6 | + 1 |
| 9   | +24 | + 1 | 50  | - 2 | + 1 | 90  | + 6 | + 1 |
| 10  | +25 | + 1 | 51  | - 1 | + 1 | 91  | + 6 | + 1 |
| 11  | - 2 | + 1 | 52  | - 2 | + 1 | 92  | + 7 | + 1 |
| 12  | - 2 | + 1 | 53  | - 2 | + 1 | 93  | + 6 | + 1 |
| 13  | - 1 |   0 | 54  | - 2 | + 1 | 94  | - 1 | - 8 |
| 14  | + 1 | + 1 | 55  | - 2 | + 1 | 95  |   0 | + 1 |
| 15  | +21 | + 1 | 56  | - 2 | + 1 | 96  | + 5 | + 1 |
| 16  | +22 | + 1 | 57  | - 2 | + 1 | 97  | + 5 | + 1 |
| 17  | +22 | + 1 | 58  | - 2 | + 1 | 98  | + 5 | + 1 |
| 18  | +22 | + 1 | 59  | - 2 | + 1 | 99  | + 5 | + 1 |
| 19  | +23 | + 1 | 60  | - 2 | + 1 | 100 | - 1 | - 7 |
| 20  | +23 | + 1 | 61  | - 2 | + 1 | 101 | + 4 | + 1 |
| 21  | +24 | + 1 | 62  | - 1 | + 1 | 102 | + 4 | + 1 |
| 22  | +24 | + 1 | 63  | - 2 | -31 | 103 | + 4 | + 1 |
| 23  | +25 | + 1 | 64  | + 1 | + 1 | 104 | - 1 | - 5 |
| 24  | +25 | + 1 | 65  | +15 | + 1 | 105 |   0 | + 1 |
| 25  | +26 | + 1 | 66  | +15 | + 1 | 106 | + 2 | + 1 |
| 26  | +26 | + 1 | 67  | +15 | + 1 | 107 | + 2 | - 4 |
| 27  | +27 | + 1 | 68  | +15 | + 1 | 108 | + 2 | + 1 |
| 28  | +28 | + 1 | 69  | +15 | + 1 | 109 | + 2 | - 2 |
| 29  | +28 | + 1 | 70  | +16 | + 1 | 110 |   0 | + 1 |
| 30  | +29 | + 1 | 71  | +16 | + 1 | 111 | + 1 | - 2 |
| 31  | +29 | + 1 | 72  | +15 | + 1 | 112 |   0 | + 1 |
| 32  | +30 | + 1 | 73  | - 1 | + 1 |     |     |     |
| 33  | +30 | + 1 | 74  | - 2 | + 1 |     |     |     |
| 34  | - 2 | + 1 | 75  | - 1 | + 1 |     |     |     |
| 35  | - 2 | -26 | 76  | - 2 | + 1 |     |     |     |
| 36  | + 1 | + 1 | 77  | - 2 | + 1 |     |     |     |
| 37  | +27 | + 1 | 78  | - 1 | + 1 |     |     |     |
| 38  | +27 | + 1 | 79  | - 2 | -31 |     |     |     |
| 39  | +28 | + 1 | 80  |   0 | + 1 |     |     |     |
| 40  | +28 | + 1 |     |     |     |     |     |     |

FIG. 3A

| ADDRESS | VALUE | ADDRESS | VALUE |
|---|---|---|---|
| 0 | 10110100 00111010 10000011 | 34 | 00000000 01110110 11000100 |
| 1 | 01001011 00001100 10011010 | 35 | 00000000 01011001 11010110 |
| 2 | 00100010 00101000 10011100 | 36 | 10110101 11000010 10000011 |
| 3 | 00010000 00010110 10011110 | 37 | 10010000 10011000 10110110 |
| 4 | 00000111 10110000 10100000 | 38 | 01110100 00011010 10110110 |
| 5 | 00000011 10110100 10100100 | 39 | 01011101 11100010 10111000 |
| 6 | 00000001 11001010 10100110 | 40 | 01001100 00111110 10111000 |
| 7 | 00000000 11011110 10101010 | 41 | 00111110 01100110 10111000 |
| 8 | 00000000 01101100 10101100 | 42 | 00110011 01010000 10111000 |
| 9 | 00000000 00110100 10110000 | 43 | 00101010 00110000 10111010 |
| 10 | 00000000 00011010 10110010 | 44 | 00100010 11101110 10111010 |
| 11 | 00000000 00001100 11000100 | 45 | 00011100 11101000 10111010 |
| 12 | 00000000 00000110 11000100 | 46 | 00010111 11110110 10111010 |
| 13 | 00000000 00000010 01000010 | 47 | 00010011 11110000 10111100 |
| 14 | 10110100 11111110 10000011 | 48 | 00010000 11000010 10111100 |
| 15 | 01111110 01001010 10101010 | 49 | 00001110 00001100 10111100 |
| 16 | 01011001 11100100 10101100 | 50 | 00001011 10011010 11000100 |
| 17 | 01000000 11111000 10101100 | 51 | 00001001 10111100 11000010 |
| 18 | 00101111 01110010 10101100 | 52 | 00001000 00011110 11000100 |
| 19 | 00100011 00000100 10101110 | 53 | 00000110 11000110 11000100 |
| 20 | 00011001 11011110 10101110 | 54 | 00000101 10101000 11000100 |
| 21 | 00010011 01000010 10110000 | 55 | 00000100 10111000 11000100 |
| 22 | 00001110 01011110 10110000 | 56 | 00000011 11110000 11000100 |
| 23 | 00001010 10111000 10110010 | 57 | 00000011 01001000 11000100 |
| 24 | 00001000 00001100 10110010 | 58 | 00000010 11000000 11000100 |
| 25 | 00000110 00000110 10110100 | 59 | 00000010 01001010 11000100 |
| 26 | 00000100 10000000 10110100 | 60 | 00000001 11101100 11000100 |
| 27 | 00000011 01100010 10110110 | 61 | 00000001 10010110 11000100 |
| 28 | 00000010 10001000 10111000 | 62 | 00000001 01010110 11000010 |
| 29 | 00000001 11101010 10111000 | 63 | 00000001 00011110 11000100 |
| 30 | 00000001 01101010 10111010 | 64 | 10110110 00100100 10000011 |
| 31 | 00000001 00010100 10111010 | 65 | 10011010 00001000 10011110 |
| 32 | 00000000 11010000 10111100 | 66 | 10000010 01011000 10011110 |
| 33 | 00000000 10011100 10111100 | | |

FIG.3B

| ADDRESS | VALUE | ADDRESS | VALUE |
|---|---|---|---|
| 67 | 01101111 10110000 10011110 | 90 | 10001001 10110010 10001100 |
| 68 | 01011111 11010000 10011110 | 91 | 01111100 01000100 10001100 |
| 69 | 01010010 01111000 10011110 | 92 | 01110000 01001000 10001110 |
| 70 | 01000110 11110010 10100000 | 93 | 01100101 01101000 10001100 |
| 71 | 00111101 10111110 10100000 | 94 | 01011100 00101111 01000100 |
| 72 | 00110101 01010010 10011110 | 95 | 10101101 01010000 10000001 |
| 73 | 00101110 10011100 11000010 | 96 | 10011110 10001100 10001010 |
| 74 | 00101000 01001000 11000100 | 97 | 10001111 11001010 10001010 |
| 75 | 00100011 00111000 11000010 | 98 | 10000011 10011110 10001010 |
| 76 | 00011110 11010110 11000100 | 99 | 01111000 01111010 10001010 |
| 77 | 00011010 10100010 11000100 | 100 | 01101110 10111101 00111100 |
| 78 | 00010111 01101100 11000010 | 101 | 10100100 01100010 10001000 |
| 79 | 00010100 10000001 11111110 | 102 | 10011000 00011110 10001000 |
| 80 | 10110000 01100100 10000001 | 103 | 10001100 01110010 10001000 |
| 81 | 10011010 00111000 10001110 | 104 | 10000010 10111101 00101100 |
| 82 | 10000111 00011100 10001110 | 105 | 10101100 01001110 10000001 |
| 83 | 01110111 10111010 10001110 | 106 | 10100001 11001110 1000010 |
| 84 | 01101001 11011100 10001110 | 107 | 10010111 00001010 10000100 |
| 85 | 01011101 01011100 10001110 | 108 | 10101011 00101110 10000100 |
| 86 | 01010011 00110100 10001110 | 109 | 10100000 10011111 00010010 |
| 87 | 01001010 00101101 10000100 | 110 | 10110100 00100000 10000001 |
| 88 | 10101010 11100000 10000001 | 111 | 10101010 01000101 00010000 |
| 89 | 10011001 01010010 10001100 | 112 | 10110011 11010111 00001001 |

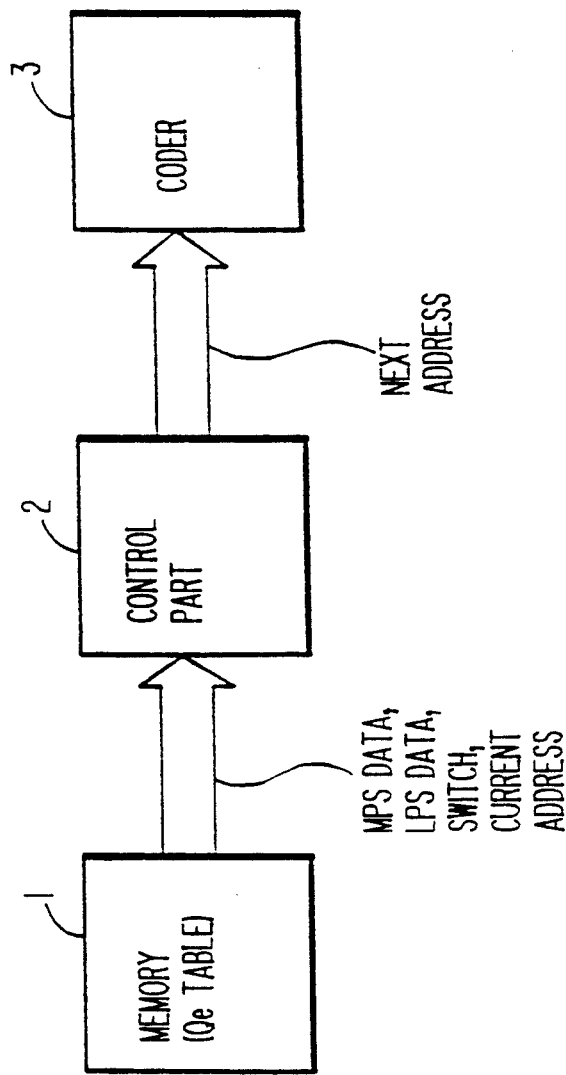

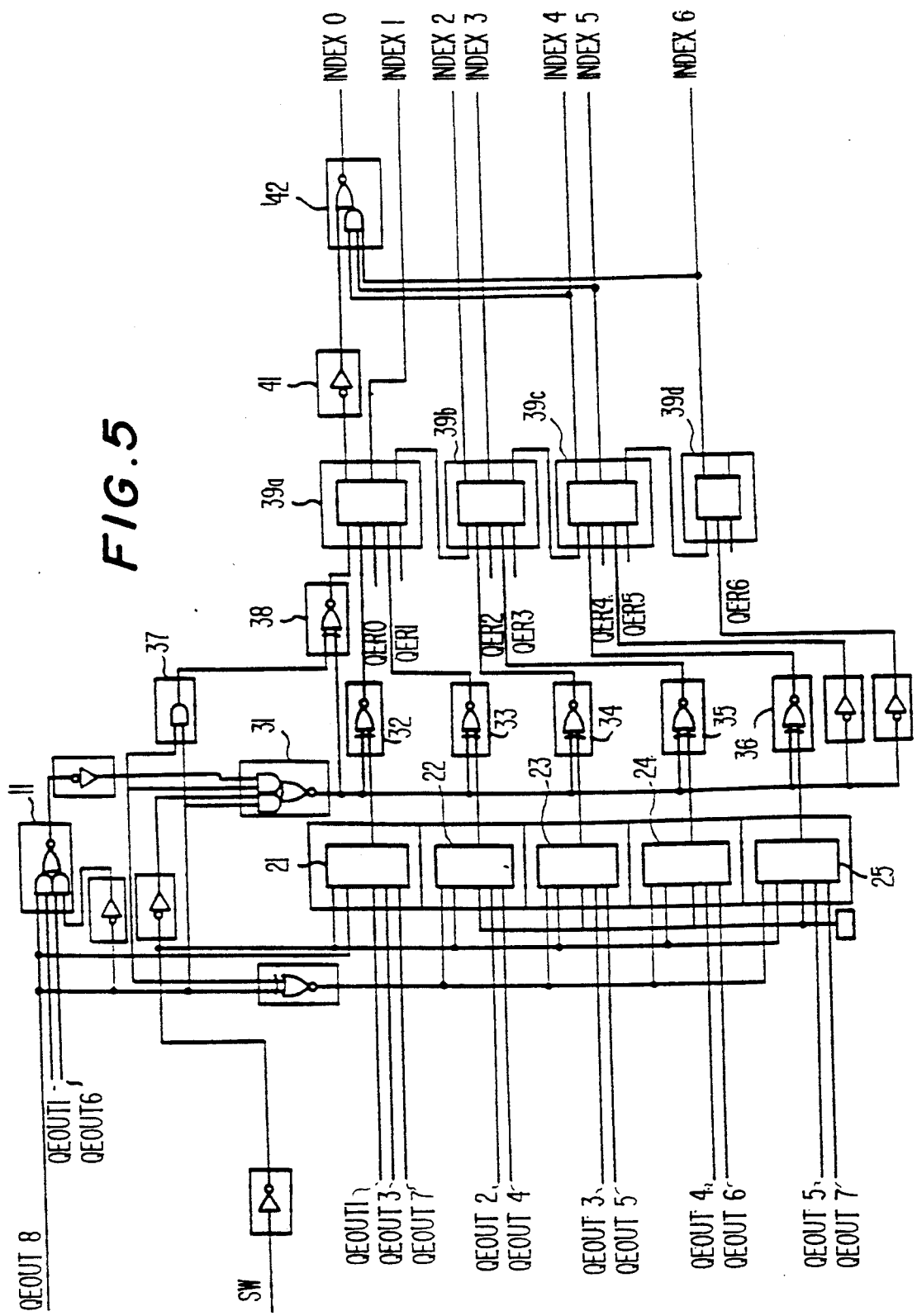

PROBABILITY ESTIMATION TABLE APPARATUS

BACKGROUND OF THE INVENTION

The present invention generally relates to a probability estimation table apparatus, and more particularly to an apparatus for reading a probability estimation table for use in an arithmetic coder as well as an apparatus for generating the probability estimation table stored in a memory of the probability estimation table reading apparatus.

The ISO/IEC International Standard of Coded Representation of Picture and Audio Information (Early Draft, WG9-S1R2, Dec. 14, 1990, the standard number being still not assigned) defines a method for compression encoding a bi-level image, and recommends a standard probability estimation table adaptive to the arithmetic coding data compression. The standardization of this technology is under way, and some prototypes of arithmetic coders for carrying out the arithmetic coding data compression have been proposed. However, there is still not a useful mechanism for outputting a next index, required for compression encoding an image, by using the standard probability estimation table.

FIGS. 1A and 1B show the standard probability estimation table recommended by the above mentioned international standard. The probability estimation table is called the Qe table. For each possible value of the index CX there is stored a 1-bit value MPS (CX) and a seven-bit value ST (CX), which together completely express the adaptive probability estimate associated with that particular index. An index CX is used to identify the index of the state of the coder for coding a current pixel.

In the standard Qe table in FIGS. 1A and 1B, four arrays are indexed by the index (CX). The MPS is the estimated most likely color for a pixel PIX in a symbol sequence. The Qe Value is a 15-bit value of the LPS interval size, which can be interpreted to be a probability based on a prescribed equation.

The arrays N/I-LPS (Next Index-LPS) and N/I-MPS (Next Index-MPS) are 7-bit values of next indexes giving, respectively, the next Qe state for an observation of the LPS and the MPS. The movement given by the N/I-MPS only occurs if in addition to observing the MPS, a renormalization also occurs. When the movement given by the N/I-LPS occurs, there will also be an inversion of MPS (CX) if the SWITCH (CX) value is 1. The array SWITCH is a 1-bit value of the MPS/LPS switch. A Qe table reading apparatus requires a memory (for example, a ROM) for storing the above mentioned standard Qe table. Since the 1-bit data of the switch and the 15-bit data of the Qe-Value are fixed and cannot be changed, a memory space of at least 112 14-bit words is required for storing the LPS data and the MPS data of the standard Qe table. However, memory chips currently available to the manufacturers at a low cost are multi-purpose 8-bit ROMs. There is a problem in that it is necessary to use a 16-bit memory chip for storing the standard Qe table with space of at least 112 14-bit words, thus increasing the manufacturing cost.

SUMMARY OF THE INVENTION

Accordingly, it is a general object of the present invention to provide an improved probability estimation table apparatus in which the above described problems are eliminated.

Another and more specific object of the present invention is to provide a probability estimation table reading apparatus in which a Qe table of the smallest possible size is stored and by means of which a next index can be generated effectively. The above mentioned object of the present invention is achieved by a probability estimation table reading apparatus which includes a memory part for storing a probability estimation table, the probability estimation table defining, with respect to each of a plurality of possible address values, a switch data value, a probability estimate data value, an LPS data value indicative of a next address value when a more probable symbol occurs in a sequence of symbols, and an MPS data value indicative of a next address when a less probable symbol occurs in the sequence of symbols, where each LPS data value has been replaced by the difference between a current address value and the next address value indicated by a standard LPS data value corresponding to the current address value, and where each MPS data value has been replaced by the difference between the current address and the next address value indicated by a standard MPS data value corresponding to the current address value, and a control part coupled to the memory part for reading out each LPS data value and MPS data value for each current address value of the stored probability estimation table, so that next address values required by the arithmetic coder to perform arithmetic coding data compression, can be generated. According to the present invention, it is possible to reduce the number of bits required for binary representation of the LPS/MPS data in the table into a total of 8 bits, and therefore a memory space for storing the table can be remarkably reduced.

Still another object of the present invention is to provide a probability estimation table generating apparatus for generating a probability estimation table which has the smallest possible size and is stored in a memory part of the Qe table reading apparatus to effectively output a next index to an arithmetic coder for carrying out the arithmetic coding data compression. The above mentioned object of the present invention is achieved by a probability estimation table generating apparatus which includes a difference generating part for generating difference values, with respect to each of a plurality of addresses ranging from 0 through 112 in decimal, on a probability estimation table which defines a switch data value, a probability estimate data value, a standard LPS data value indicative of a next address value when a more probable symbol occurs in a sequence of symbols, and a standard MPS data value indicative of a next address value when a less probable symbol occurs in the sequence of symbols, an LPS difference data value represented by a difference value between a current address value and a next address value when the next address value is indicated by the standard LPS data corresponding to the current address, an MPS difference data value represented by a difference value between the current address value and a next address value when the next address value is indicated by the standard MPS data value corresponding to the current address, and an MPS sign data value indicative of whether the MPS difference data value corresponding to the current address is positive, negative or equal to zero, an MPS data generating part coupled to the difference generating part, for generating an MPS data value having either six binary digits or two binary digits based on the MPS difference data value supplied by the difference generating part for each of the plurality of addresses, where the number of the binary digits is determined in response to the MPS sign data value supplied by the difference generating part for each of the plurality of addresses and where the MPS data generating part replaces the standard MPS data value by the MPS data value for each of the plurality of addresses of the stored table, and an LPS data generating part, coupled to the difference generating part, for generating an LPS data value having either six binary digits or two binary digits based on the LPS difference data value supplied by the difference generating part for each of the plurality of addresses, where the number of the binary digits is determined in response to the MPS sign data value supplied by the difference generating part for each of the plurality of addresses and where the LPS data generating part replaces the standard LPS data value by the LPS data value for each of the plurality of addresses of the stored table. According to the present invention, it is possible to reduce the number of bits required for binary representation of the LPS/MPS data in the Qe table, and therefore a memory space needed for storing the Qe table can be reduced remarkably.

Other objects and further features of the present invention will become more apparent from the following detailed description when read in conjunction with the accompanying drawings.

BRIEF DESCRIPTION OF THE DRAWINGS

FIGS. 1A and 1B are the standard Qe table recommended by the international standard;

FIG. 2 is an LPS/MPS data table in which a difference between the current index and the next index is substituted for each next index of the LPS/MPS data of the table of FIGS. 1A and 1B;

FIGS. 3A and 3B are charts showing a Qe table which is developed from the table of FIG. 2 according to the present invention;

FIGS. 4A and 4B are block diagrams showing a memory part and a control part in the Qe table reading apparatus of the present invention;

FIG. 5 is a circuit diagram showing the control part of the Qe table reading apparatus to which the present invention is applied.

DESCRIPTION OF THE PREFERRED EMBODIMENT

Figure 4B:
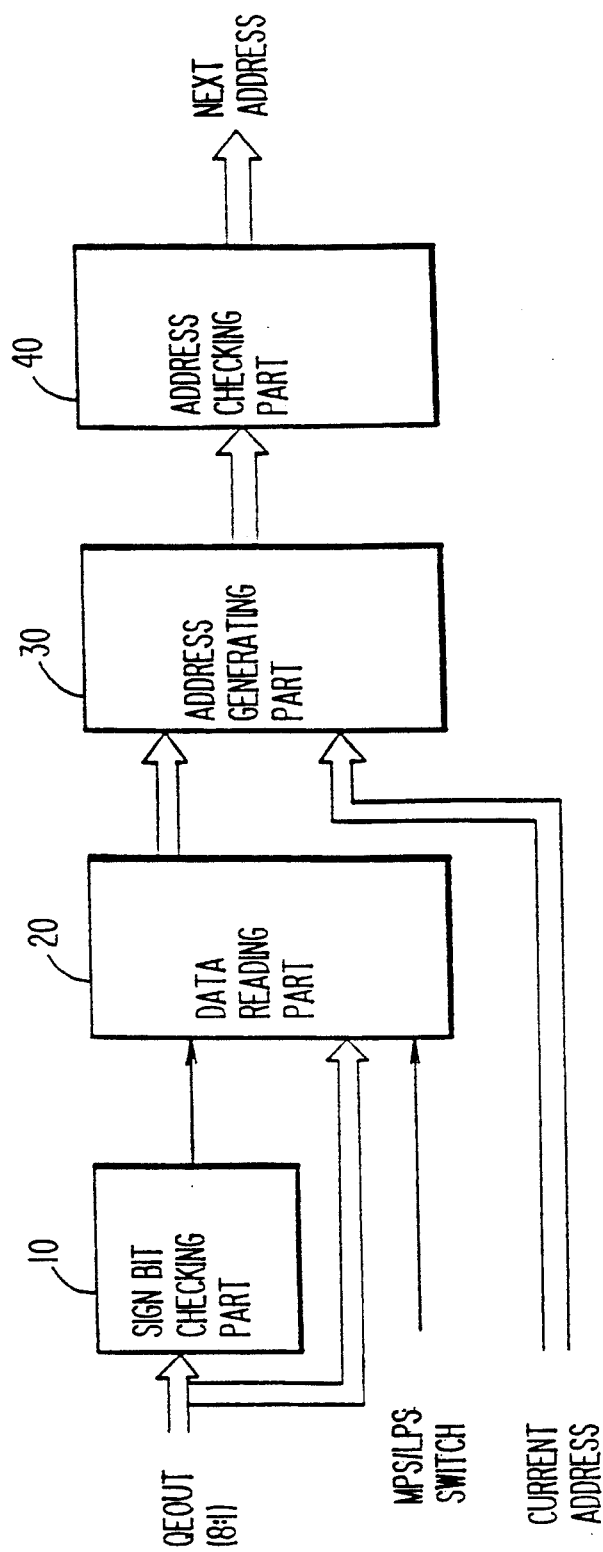

First, a description will be given of a process of making a useful probability estimation table according to the present invention, by referring to FIGS. 2, 3A and 3B. In the standard Qe table shown in FIGS. 1A and 1B, data in the array N/I-LPS denotes a next index in decimal when the less probable symbol LPS occurs in a sequences of symbols, and data in the array N/I-MPS denotes a next index in decimal when the more probable symbol MPS occurs in the symbol sequence. The LPS data in the standard Qe table ranges from "1" to "112" in decimal, and the MPS data therein ranges from "1" to "111" in decimal. Therefore, at least 7 bits are required for representing each of the LPS data and the MPS data, so that 14 bits in total are required for representing both the LPS data and the MPS data for each index. In the Qe table reading apparatus of the invention, the memory space required for storing the data of the next indexes is reduced remarkably, as described in the following.

FIG. 2 shows an LPS/MPS data table defining, with respect to each value of the index, LPS data indicative of a next index for the LPS occurrence and MPS data indicative of a next index for the MPS occurrence. In this LPS/MPS data table, the LPS data and the MPS data shown in FIGS. 1A and 1B are replaced by differences between a current index and a next index indicated by a corresponding LPS data or a corresponding MPS data, for each possible value ("0" through "112") of the index. In this LPS/MPS data table, for example, the LPS data "14" for the index "1" shown in FIG. 1A is replaced by a difference "+13" between the current index "1" and the next index "14" indicated by the LPS data corresponding to the current index. Also, the MPS data "2" for the index "1" shown in FIG. 1A is replaced by a difference "+1" between the current index "1" and the next index "2" indicated by the MPS data corresponding to the current index "1". Similarly, the LPS data "16" for the index "2" is replaced by a difference "+14" between the current index "2" and the next index "16" indicated by the LPS data corresponding to the current index, and the MPS data "3" for the index "2" is replaced by a difference "+1" between the the current index "2" and the next index "3" indicated by the MPS data corresponding to the current index. In this manner, the differences between the current index and the next index for both the LPS data and the MPS data are calculated with respect to each possible value of the index, and the LPS data and the MPS data are, respectively, replaced by the corresponding differences thus calculated, except those for the index "0". In other words, the LPS data and the MPS data with respect to the index "0" in the LPS/MPS data table shown in FIG. 2 are the same as corresponding data shown in FIG. 1A.

It should be noted from FIG. 2 that the LPS data in the LPS/MPS data table shown in FIG. 2 ranges from "−2" to "+30" in decimal, and the MPS data therein ranges from "−31" to "+1" in decimal. Therefore, if a sign bit is included, only 6 bits are required for representing each of the LPS data and the MPS data, and the number of bits required for binary representation of the LPS data and the MPS data for each index is reduced to a total of 12 bits.

It should also be noted from FIG. 2 that the LPS data and the MPS data do not concurrently have the maximum value "+30" nor the minimum value "−31". When the MPS data in the table shown in FIG. 2 is positive or equal to zero, the value of the MPS data is limited to "+1" or "0" in decimal. In this case, therefore, the least number of bits required for the binary representation is 6 bits for the LPS data and 2 bits for the MPS data if a sign bit of the MPS data is included. Hence, it is possible to reduce the total number of bits required for the binary representation of the LPS data and the MPS data to 8 bits, if the LPS data is expressed in 6 binary digits and the MPS data is expressed in 2 binary digits in which a sign bit is included.

When the MPS data in the LPS/MPS data table shown in FIG. 2 is negative, the value of the LPS data is limited to "−2", "−1", "0", "+1" and "+2" in decimal. Thus, the least number of bits required for the binary representation is 6 bits for the MPS data and 3 bits for the LPS data if a sign bit of the LPS data is included. In this case, also, it is possible to reduce the total number of bits required for the binary representation of the LPS data and the MPS data into 8 bits if the following measure is taken. That is, when the MPS data is negative and the LPS data is not equal to zero, "1" is subtracted from the original LPS data, and the corresponding part of the stored LPS/MPS data table is replaced by the reduced LPS data. Only when the MPS data is negative and the LPS data is equal to zero, the LPS data remains unchanged, and the corresponding part of the LPS/MPS data table is set to zero. Thus, the LPS data in the LPS/MPS data table can be expressed in two binary digits which are limited to "11", "10", "00" and "01". However, there is a problem in that it is impossible to detect whether the value of the LPS data, obtained from the Qe table, is equal to "1" or "0" in decimal. In order to solve this problem, after the LPS data is read out from the Qe table, the LPS data can be restored to the original state if "1" is added to the LPS data only when the MPS data is negative and the LPS data is not equal to zero. As obvious from FIG. 2, the case for the index "112" is the only case in which the MPS data is negative and the LPS data is equal to zero. Thus, when it is detected that the next index is equal to "113" in decimal, the next index is always changed into "112".

Accordingly, when the MPS data is negative, it is possible to reduce the total number of bits required for the binary representation of the LPS data and the MPS data to 8 bits, if the MPS data is expressed in 6 binary digits and the LPS data is expressed in 2 binary digits which can be described as one from among "11", "10", "00" and "01". If the above described measure is taken, the LPS data and the MPS data can always be represented by a total of 8 binary digits, regardless of whether the MPS data is positive or not. Thus, it is possible to reduce the total number of bits required for the binary representation of the LPS data and the MPS data to 8 bits.

FIGS. 3A and 3B show a probability estimation table in which the number of bits required for representing the LPS data and the MPS data is reduced in the manner described above. The standard probability estimation table shown in FIGS. 1A and 1B requires 30 bits for representing the data of the table for each word, and requires 14 bits for representing the LPS data and the MPS data of the table. However, the probability estimation table shown in FIGS. 3A and 3B requires only 8 bits for representing the LPS data and the MPS data for each word. Thus, the memory space needed for storing the Qe table of the present invention is reduced remarkably, and it is unnecessary to use a 16-bit memory chip for installing a probability estimation table in the Qe table reading apparatus. In the Qe table shown in FIGS. 3A and 3B, each 24-bit data string is indexed by an address value (or the index), and the top bit of each data string denotes a switch bit, the 1st through 8th bits denoting a reduced next index value of the LPS data and the MPS data, which is determined in the manner described above, and the 9th through 23th bits denoting a value of the probability estimate with respect to each of a plurality of address values.

Next, a description will be given of the Qe table reading apparatus of the present invention, with reference to FIGS. 4A, 4B and 5. In FIG. 4A, a control part 2 of the Qe table reading apparatus outputs a next address value to an arithmetic coder 3 based on readout data of the above Qe table stored in a memory part 1 provided in the apparatus. FIG. 4B shows the construction of the control part 2 of the Qe table reading apparatus of the present invention. In FIG. 4B, a sign bit checking part 10, coupled to the memory part 1, detects whether or not a readout data obtained from the stored Qe table is positive by checking a leftmost sign bit of each word corresponding to the readout data. This readout data is from the 1st through 9th bits of each 24-bit word included in the stored Qe table in the memory part 1. A data reading part 20, coupled to the memory part 1 and the sign bit checking part 10, generates input data based on the readout data obtained from the Qe table, and based on a sign data supplied by the sign bit checking part 10. The input data is determined by the data reading part 20, in response to a switch bit of the readout data and the sign data, as being either the LPS data or the MPS data in the stored Qe table. An address generating part 30, coupled to the data reading part 20, generates a next address required for arithmetic coding data compression, by adding the input data generated by the data reading part 20 to a current address, corresponding to the above readout data, supplied by an external control unit. An address checking part 40, coupled to the address generating part 30, detects whether or not the next address generated by the address generating part 30 equals 113 in decimal. If the value of the generated next address is equal to 113 in decimal, the address checking part 40 converts the next address to 112.

FIG. 5 shows the construction of the control part of the Qe table reading apparatus of the present invention. In FIG. 5, a current address value indicating a location of the stored Qe table is supplied from the memory part 1 via lines QER0 through QER6. A readout data of the 8-bit LPS/MPS data obtained from the Qe table is supplied via lines QEOUT1 through QEOUT8. A switch signal SW for causing the MPS/LPS switching is supplied via a line SW. The control part 2 outputs a next address value to the arithmetic coder 3 via lines INDEX1 through INDEX6.

The data reading part 20 has circuit elements 21 through 25 generating input data based on the readout data supplied via lines QEOUT1 through QEOUT8, a sign bit of the MPS data, and a switch signal supplied via line SW. If it is detected from the sign bit and the switch signal that the MPS data is positive and the MPS/LPS switching does not occur, the circuit elements 21 through 25 output 5-bit data value via line QEOUT7. If it is detected that the MPS data is positive and the switching occurs, the circuit elements 21 through 25 output 5-bit data value via lines QEOUT1 through QEOUT6. If it is detected that the MPS data is not positive and the switching does not occur, the circuit elements 21 through 25 output 5-bit data value via lines QEOUT3 through QEOUT7. If it is detected that the MPS data is not positive and the switching occurs, the circuit elements 21 through 25 output 5-bit data via line QEOUT1.

A sign bit checking part 11 uses a QEOUT2 data value as a sign bit of the LPS data if the MPS data is positive. If the MPS data is not positive, it uses a QEOUT6 data value as the sign bit of the LPS data. The address generating part of the circuit system includes circuit elements 31 through 36 and circuit elements 39a through 39d. The circuit element 31 is a switching circuit in which addition/subtraction exchange occurs, selectively, in response to the switch signal and the sign bits of the LPS/MPS data. An addition state of the circuit element 31 occurs when the addition of the input data generated by the elements 21 through 25 is necessary. The state of the circuit element 31 is inverted when subtraction of the input data is necessary. The circuit elements 39a through 39d generate a next address value by adding the input data value generated by the elements 21 through 25 to the current address value supplied via lines QER0 through QER6. The circuit elements 37 and 38 add "1" to the input data generated by the elements 21 through 25 when the MPS data is negative and the switching of the MPS does not occur, or when the LPS data is positive and the switching occurs. The address checking part includes circuit elements 41 and 42 which change the generated next address into "112" in decimal if it is detected that the next address equals "113" in decimal. The switching of the MPS occurs if the switch data in the table equals 1. If the switch data in the table equals zero, the switching of the MPS does not occur.

As described above, it is possible to reduce the number of bits required for binary representation of the LPS/MPS data in the table to a total of 8 bits, and therefore memory space needed for storing the probability estimation table can be reduced remarkably. Also, it is possible to effectively output a next address value by means of the stored probability estimation table.

Next, a description will be given of a Qe table generating apparatus for generating the Qe table stored in the memory part of the above described Qe table reading apparatus, with reference to FIG. 6 This Qe table generating apparatus according to the present invention generally has a difference making part 50, an MPS data making part 60 coupled to the part 50, and an LPS data making part 70 coupled to the part 50. The LPS data making part 70 has an LPS data compression part 80 coupled to the LPS data making part 70.

With respect to a particular current index of the standard Qe table shown in FIGS. 1A and 1B, a 7-bit data of the standard MPS data, a 7-bit data of the standard LPS data, and data of that particular current index are supplied to the difference making part 50. The supplying of these data to the difference making part 50 is made for each possible values "0" through "112" of the index of the standard Qe table. An MPS difference data indicative of a difference between the current index and a next index indicated by the standard MPS data, and an LPS difference data indicative of a difference between the current index and a next index indicated by the standard LPS data are generated by the difference making part 50 with respect to each value of the index of the standard Qe table. In the LPS/MPS data table shown in FIG. 2, the standard LPS data and the standard MPS data are replaced by such an LPS difference data and such a MPS difference data generated by the part 50, respectively.

For example, when a current index "1" is supplied to the difference making part 50, the standard LPS data for that current index indicating "14" in decimal as the next index, and the standard MPS data for that current index indicating "2" in decimal as the next index are given to the difference making part 50. An LPS difference data indicating a difference "+13" between the current index "1" and the next index "14" indicated by the standard LPS data, and an MPS difference data indicating a difference "+1" between the current index "1" and the next index "2" indicated by the standard MPS data are generated by the difference making part 50. Similarly, when a current index "2" is supplied to the difference making part 50, the standard LPS data for the current index "2" indicating the next index "16" in decimal and the standard MPS data for the current index "2" indicating the next index "3" in decimal are given to the difference making part 50. An LPS difference data indicating a difference "+14" between the current index "2" and the next index "16" indicated by the standard LPS data, and an MPS difference data indicating a difference "+1" between the current index "2" and the next index "1" indicated by the standard MPS data are generated by the difference making part 50. In this manner, the differences between the current index and the next index for both the LPS data and the MPS data are calculated by the difference making part 50 with respect to each possible value ("0" through "112") of the index, and the standard LPS data and the standard MPS data in the standard Qe table are, respectively, replaced by the corresponding differences as in the LPS/MPS data table shown in FIG. 2, except those for the index "0". Exceptionally, the LPS data and the MPS data with respect to the index "0" are the same as those corresponding standard LPS/MPS data shown in FIG. 1A.

Figure 6:
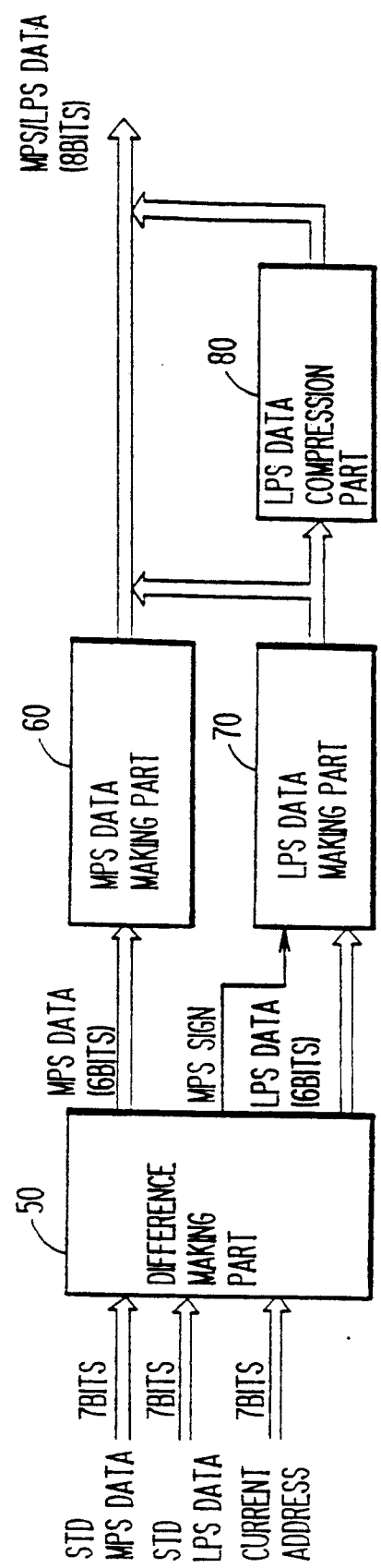
FIG. 6 is a block diagram showing a Qe table generating apparatus for generating the probability estimation table shown in FIGS. 3A and 3B, to which the present invention is applied.

In the above described difference making part 50 in FIG. 6, the particular current index, the standard MPS data and the standard LPS data for that particular current index are supplied thereto. However, a modification of this difference making part may be made. In such a modified difference making part, the standard MPS data and the standard LPS data for each possible value "0" through "112" of the index are, in advance, stored, and each standard MPS/LPS data is read out in response to a current index supplied to the difference making part, and the above described differences are generated for each value of the index.

As in the LPS/MPS data table shown in FIG. 2, the LPS difference data ranges from "−2" to "+30" in decimal, and the MPS difference data ranges from "−31" to "+1" in decimal. Therefore, if a sign bit is included for binary representation of the LPS/MPS difference data, only 6 bits are required for representing each of the LPS difference data and the MPS difference data, and the total number of bits required for each index is reduced into 12 bits.

In FIG. 6, an output of the difference making part 50 is coupled to the MPS data making part 60 for sending a 6-bit MPS difference data to the MPS data making part 60, an output of the difference making part 50 is coupled to the LPS data making part 70 for sending a 6-bit LPS data difference data to the LPS data making part 70, and a sign-bit output of the difference making part 50 is coupled to the LPS data making part 70 for sending to the part 70 a sign-bit data indicative of whether the value of the MPS difference data is positive, equal to zero, or negative.

As shown in the LPS/MPS data table shown in FIG. 2, the LPS difference data and the MPS difference data do not concurrently have the maximum value "+30" nor the minimum value "−31". When the supplied MPS difference data is positive or equal to zero, the value of the MPS difference data is limited to "+1" or "0" in decimal if the LPS difference data has the maximum value "+30" or the minimum value "−2". That is, when the MPS data making part 60 detects in response to a sign bit of the supplied MPS difference data that the value of the MPS difference data is positive or equal to zero, a 2-bit MPS data indicating the MPS difference data is generated by the MPS data making part 60. On the other hand, when the supplied MPS difference data is negative, the value of the LPS data is limited to "−2", "−1", "0", "+1" and "+2" in decimal if the MPS difference data has the minimum value "−31". That is, when it is detected in response to a sign bit of the MPS difference data that the value of the MPS difference data is negative, a 6-bit MPS data indicating the MPS difference data is generated by the MPS data making part 60.

In response to the supplied sign-bit data of the MPS difference data, the LPS data making part 70 detects whether the value of the MPS difference data is positive, negative, or equal to zero. When it is detected that the value of the MPS difference data is positive or equal to zero, a 6-bit LPS data indicating the LPS difference data is generated by the LPS data making part 70. On the other hand, when it is detected that the value of the MPS difference data is negative, the value of the LPS data is limited to "−2", "−1", "0", "+1" and "+2" in decimal if the MPS difference data has the minimum value "−31", and a 3-bit LPS data indicating the LPS difference data is generated by the LPS data making part 70.

The 6-bit or 2-bit MPS data is output by the MPS data making part 60 as the MPS data in the Qe table (FIG. 3) to be stored, regardless of whether the value of the MPS difference data is positive, negative, or equal to zero. The 6-bit LPS data is output by the LPS data making part 70 as the LPS data of the Qe table (FIG. 3) to be stored, when the value of the MPS difference data is positive or equal to zero. However, when the value of the MPS difference data is negative, the 3-bit LPS data is output by the LPS data making part 70 to the LPS data compression part 80.

In the LPS data compression part 80, the 3-bit LPS data supplied is converted into 2-bit LPS data by taking the above described measure when the MPS difference data is negative. That is, when the LPS data is not equal to zero and the MPS difference data is negative, "1" in decimal is subtracted by the LPS data compression part 80 from the absolute value of the supplied 3-bit LPA data, and the thus converted LPS data (=the absolute value of the LPS difference data minus "1") is output by the LPS data compression part 80 as the 2-bit LPS data of the Qe table (FIG. 3) to be stored. Therefore, when the 2-bit LPS data is read out by the Qe table reading apparatus from the stored Qe table, "1" is always added to the LPS data. When the LPS data is equal to zero, the unchanged LPS data (=the LPS difference data equal to zero) is output by the LPS data compression part 80 as the 2-bit LPS data of the Qe table (FIG. 3) to be stored. Hence, the 2-bit LPS data output by the LPS data compression part 80 as the LPS data of the stored Qe table (FIG. 3) is limited to "11", "10", "00", or "01" in binary representation. Accordingly, it is possible to always reduce the total number of bits required for binary representation of the LPS data and the MPS data in the Qe table (FIG. 3) to be stored into 8 bits.

Only when the MPS difference data is negative and the LPS difference data is equal to zero, the unchanged LPS data (=the LPS difference data equal to zero) is output by the LPS data compression part 80 as the 2-bit LPS data of the Qe table (FIG. 3) to be stored. As being obvious from the LPS/MPS data table of FIG. 2, the LPS data and the MPS data for the index "112" is the only case in which the MPS data is negative and the LPS data is equal to zero. Thus, only when it is detected by the Qe reading apparatus that the next index indicated by the readout data is equal to "113", the next index is changed into "112".

Further, the present invention is not limited to the above described embodiment, and variations and modifications may be made without departing from the scope of the present invention.

What is claimed is:

1. An apparatus for reading a simplified probability estimation table for use in an arithmetic coder, wherein said simplified probability estimation table is generated from a previously defined standard probability estimation table, said apparatus comprising:

memory means for storing said simplified probability estimation table, said simplified probability estimation table defining, with respect to each of a plurality of possible address values, a switch data value, a probability estimate data value, an LPS data value which is equal to the difference between a current address value and a corresponding standard LPS data value from said standard probability estimation table, and an MPS data value which is equal to the difference between said current address value and a corresponding standard MPS data value from said standard probability estimation table; and control means coupled to said memory means for reading out said LPS and MPS data values from a location of the simplified probability estimation table in said memory means corresponding to a current address value, and for generating a next address value required for the arithmetic coder to perform arithmetic coding data compression.

2. An apparatus according to claim 1, wherein said control means comprises:

sign bit checking means coupled to said memory means for detecting whether or not a data value read out from the simplified probability estimation table is positive by checking a sign bit corresponding to said read out data value;

data reading means coupled to the memory means and the sign bit checking means for reading out said LPS and MPS data values from the simplified probability estimation table, and for selecting, as an input value, one of said LPS and MPS data values corresponding to said current address value in accordance with an output from said sign bit checking means and a switch data value corresponding to said current address value;

address generating means coupled to said data reading means for generating a next address value required for arithmetic coding data compression by adding said input data value selected by said data reading means to said current address value unless the MPS data value in the simplified probability estimation table is negative and the switch data value is zero, or the LPS data value in the simplified probability estimation table is positive and the switch data value equal one; and address checking means coupled to said address generating means, wherein said address checking means includes means for detecting whether or not said generated next address value is equal to 113 in decimal, and means for converting a generated next address value to 112 in decimal if said generated next address value is equal to 113 in decimal.

3. An apparatus according to claim 2, wherein said address generating means includes means for adding the value one to the input data value generated by the data reading means when the MPS data value in the simplified probability estimation table is negative and the switch data value equals zero, or when the LPS data value in the simplified probability estimation table is positive and the switch data value equals one.

4. An apparatus according to claim 1, further comprising means for determining whether said difference value between said current address value and the corresponding standard MPS data value is a positive value, wherein a first number of bits required for representing LPS data values for each address value in the stored table and a second number of bits required for representing MPS data values for each address value in the simplified probability estimation table vary in accordance with the difference value between said current address value and said corresponding standard MPS data value.

5. An apparatus according to claim 1, further comprising means for expressing the LPS data values in said simplified probability estimation table by six binary digits and the MPS data values in said simplified probability estimation table by two binary digits if the difference value between said current address value and said corresponding standard MPS data value is positive.

6. An apparatus according to claim 1, further comprising means for expressing the LPS data values in said simplified probability estimation table by two binary digits and the MPS data values in said simplified probability estimation table by six binary digits if the difference value between said current address value and said corresponding standard MPS data value is negative or equals zero.

7. An apparatus according to claim 1, further comprising means for replacing an LPS data value in the simplified probability estimation table with a value which is calculated by subtracting the value one from an absolute value of the difference value between said current address value and said corresponding standard LPS data value if said corresponding standard LPS data value is not equal to zero and said corresponding standard LPS data value on said standard probability estimation table is negative.

8. An apparatus for generating a simplified probability estimation table from a previously defined standard probability estimation table wherein said simplified probability estimation table is to be stored in a memory of a probability estimation table reading apparatus for use of a probability estimation table reading apparatus for use in an arithmetic coder, said apparatus comprising:

difference generating means for generating difference values with respect to each of a plurality of addresses on said standard probability estimation table, where said addresses range from 0 through 112 in decimal, and said standard probability estimation table defines for each address a switch data value, a probability estimate data value, an LPS data value indicative of a next address when a more probable symbol occurs in a sequence of symbols, and an MPS data value indicative of a next address when a less probable symbol occurs in said sequence of symbols, wherein said difference generating means comprises means for generating a first difference value between a current address value and a next address value which represents a standard LPS data value corresponding to said current address value on said standard probability estimation table, and means for generating a second difference value between said current address value and a next address value which represents a standard MPS data value corresponding to said current address value on said standard probability estimation table; and means for substituting each respective first difference value for each of said standard LPS values on said standard probability estimation table and for substituting each respective second difference value for each of said standard MPS data values on said standard probability estimation table.

9. An apparatus for generating a simplified probability estimation table from a previously defined standard probability estimation table, wherein said simplified probability estimation table is to be stored in a memory of a probability estimation table reading apparatus for use in an arithmetic coder, said apparatus comprising:

difference generating means for generating LPS and MPS difference values, with respect to each of a plurality of addresses ranging from 0 through 112 in decimal, on said previously defined standard probability estimation table which defines switch data values, probability estimate data values, standard LPS data values indicative of next address values when a more probable symbol occurs in a sequence of symbols, and standard MPS data values indicative of next address values when a less probable symbol occurs in said sequence of symbols, wherein said difference generating means includes means for representing LPS difference data values by difference values between current address values and next address values when said next address values are indicated by the standard LPS data values corresponding to said current address values, and means for representing said MPS difference data values by difference values between said current address values and next address values when said next address values are indicated by the standard MPS data values corresponding to said current address are positive, negative or equal to zero;

MPS data generating means, coupled to said difference generating means, for generating MPS data values, each having either six binary digits or two binary digits based on said MPS difference data values supplied by said difference generating means for each of said plurality of addresses, where the number of said binary digits is determined in response to said MPS sign data values supplied by said difference generating means for each of said plurality of addresses; and LPS data generating mans, coupled to said difference generating means, for generating LPS data values, each having either six binary digits or two binary digits based on said LPS difference data values supplied by said difference generating means for each of said plurality of addresses, where the number of said binary digits is determined in response to said MPS sign data values supplied by said difference generating means for each of said plurality of addresses.

10. An apparatus according to claim 9, wherein said LPS data generating means includes:

first LPS data means for generating a six-bit LPS data value based on said LPS difference data value supplied by the difference generating means if a corresponding MPS sign data values indicates that said MPS difference data value is positive or equal to zero, and for generating a three-bit LPS data value based on said LPS difference data value supplied by the difference generating means if a corresponding MPS sign data value indicates that the MPS difference data value is negative; and second LPS data means for generating a two-bit LPS data value by subtracting the value one from an absolute value of said three-bit LPS data value supplied by said first LPS data means when said MPS difference data value is negative.

11. An apparatus according to claim 9, wherein said MPS data generating means generates a six-bit MPS data based on an MPS difference data value supplied by said difference generating means if a corresponding MPS sign data value indicates that the MPS difference data value is negative, and generates a two-bit MPS data value based on an MPS difference data value supplied by said difference generating means if a corresponding MPS sign data value indicates that the MPS difference data value is positive or equal to zero.

12. An apparatus for reading a simplifier probability estimation table for use in an arithmetic coder, wherein said simplified probability estimation table is generated from a previously defined standard probability estimation table, said apparatus comprising:

memory means for storing said simplified probability estimation table, said simplified probability estimation table defining, with respect to each of a plurality of possible address values, a switch data value, a probability estimate data value, an LPS data value which is equal to the difference between a current address value and standard LPS data value from said standard probability estimation table, and an MPS data value which is equal to the difference between a current address value and a corresponding standard MPS data value from said standard probability estimation table;

control means coupled to said memory means for reading out each of said LPS data values and MPS data values for each of said current address values of the simplified probability estimation table wherein said control means comprises:

sign bit checking means coupled to said memory means for detecting whether or not a data value read out from the simplified probability estimation table is positive by checking a sign bit corresponding to said read out data value;

data reading means coupled to the memory means and said sign bit checking means for selecting, as an input data value, one of said LPS and MPS data values corresponding to said current address value in accordance with an output from said sign bit checking means and said switch data value corresponding to said current address value;

address generating means coupled to said data reading means for generating said next address value required for arithmetic coding data compression by adding said input data value selected by said data reading means to said current address value corresponding to said read out data value; and address checking means coupled to said address generating means for detecting whether or not said generated next address value is equal to 113 in decimal.

* * * * *